(12) United States Patent
Wu et al.

(10) Patent No.: US 8,422,580 B2
(45) Date of Patent: Apr. 16, 2013

(54) METHOD OF AND APPARATUS FOR SPACE-TIME-FREQUENCY CODING

(75) Inventors: Gang Wu, Shanghai (CN); Qi Zhou, Shanghai (CN); Ni Ma, Shanghai (CN); Xiaobo Zhang, Shanghai (CN)

(73) Assignees: Koninklijke Philips Electronics N.V., Eindhoven (NL); Sharp Corporation, Osaka (JP)

( * ) Notice: Subject to any disclaimer, the term of this patent is extended or adjusted under 35 U.S.C. 154(b) by 1163 days.

(21) Appl. No.: 12/303,749

(22) PCT Filed: May 30, 2007

(86) PCT No.: PCT/IB2007/052027
§ 371 (c)(1),
(2), (4) Date: Dec. 8, 2008

(87) PCT Pub. No.: WO2007/141710
PCT Pub. Date: Dec. 13, 2007

(65) Prior Publication Data
US 2010/0232532 A1    Sep. 16, 2010

(30) Foreign Application Priority Data
Jun. 8, 2006    (CN) .......................... 2006 1 0091712

(51) Int. Cl.
*H04B 7/02* (2006.01)
*H04L 27/00* (2006.01)
*H03C 7/02* (2006.01)

(52) U.S. Cl.
USPC ............................. 375/267; 375/295; 370/208

(58) Field of Classification Search .................. 375/267, 375/295; 370/208
See application file for complete search history.

(56) References Cited

U.S. PATENT DOCUMENTS
6,865,237 B1 * 3/2005 Boariu et al. ................. 375/295
2003/0072395 A1 * 4/2003 Jia et al. ........................ 375/341
(Continued)

FOREIGN PATENT DOCUMENTS
WO    2004038987 A2    5/2004
WO    2004073275 A1    8/2004

OTHER PUBLICATIONS

Ouachani I et al : "Trading rate versus diversity in space-time-frequency block coding schemes" Control, Communications and Signal Processing. First International Symposium on Hammamet , IEEE March 21, 2004, pp. 171-174, XP010705669 ISBN: 0-7803-8379-6.

(Continued)

*Primary Examiner* — David C. Payne
*Assistant Examiner* — Sarah Hassan (57) ABSTRACT

A space-time-frequency encoding scheme, for use in wireless communication systems, transforms a plurality of input element pairs into a plurality orthogonal element pairs, each of the plurality of input element pairs and corresponding orthogonal element pairs forming an orthogonal matrix. A first element, second element and a duplicate of the second element in each of the plurality of input element pairs and corresponding orthogonal element pairs are mapped as channel elements to three predetermined time-frequency cells in respective first and second two-dimension time-frequency matrixes for transmission via different antennas. As the input element pairs and corresponding orthogonal element pairs, transmitted via different antennas, are orthogonal in both the space-time domain and the space-frequency domain at the same time, two-dimension space-time transmit diversity gain and space-frequency transmit diversity gain can be achieved at the same time.

12 Claims, 4 Drawing Sheets

U.S. PATENT DOCUMENTS

| | | | |
|---|---|---|---|
| 2003/0138058 A1 | 7/2003 | Agrawal et al. | |
| 2004/0120274 A1* | 6/2004 | Petre et al. | 370/320 |
| 2004/0120416 A1* | 6/2004 | Pauli et al. | 375/267 |
| 2004/0234003 A1 | 11/2004 | Alamouti et al. | |
| 2005/0185734 A1* | 8/2005 | Hottinen et al. | 375/295 |
| 2006/0153312 A1* | 7/2006 | Yun et al. | 375/267 |
| 2006/0203711 A1* | 9/2006 | Oh et al. | 370/208 |
| 2007/0105508 A1* | 5/2007 | Tong et al. | 455/101 |
| 2007/0211822 A1* | 9/2007 | Olesen et al. | 375/299 |
| 2008/0267310 A1* | 10/2008 | Khan et al. | 375/267 |

OTHER PUBLICATIONS

Torabi M et al: "A new space-frequency-time block coded OFDM scheme for broadband wireless communications" CCECE 2003. Canadian Conference on Electrical and Computer Engineering. Montreal, vol. 3 of 3, May 4, 2003, pp. 247-250, XP010653874 ISBN: 0-7803-7781-8.

Al-Dhabir n. et al: "Three space-time block-coding schemes for frequency-selective fading channels with application to EDGE" VTC Fall 2001. IEEE 54TH. Vehicular Technology Conference. Proceedings. vol. 1 of 4. Conf. 54, Oct. 7, 2001, pp. 1834-1838, XP010562281 ISBN: 0-7803-7005-8.

Helmut Boleskei, et al: Space-Frequency Coded Broadband Ofdm Systems, IEEE 2000, pp. 1-6.

A. Huebner, et al: A Simple Space-Frequency Coding Scheme with Cyclic Delay Diversity for OFDM, pp. 1-5, 2003.

Steve Parker, et al: Space-Time Codes for Future WLANs: Principles, Practice, and Performance, IEEE Communications Magazine • Dec. 2004, pp. 96-103.

\* cited by examiner

Frequency

| | $f_1$ ... $f_Q$ | ... | $f_{2Q}$ | ... |

Time, $t_1$ to $t_{2P}$:

| $b_{1,1}$ ... $b_{1,Q}$ | $b_{P+1,1}$ ... $b_{P+1,Q}$ | $b_{1,Q+1}$ ... $b_{1,2Q}$ |
| $\vdots$ | $\vdots$ | $\vdots$ |
| $b_{P,1}$ ... $b_{P,Q}$ | $b_{2P}$ ... $b_{2P+Q}$ | $b_{P,Q+1}$ ... $b_{P+2Q}$ |
| $b_{P+1,1}$ ... $b_{P+1,Q}$ | $b_{1,Q+1}$ ... $b_{1,2Q}$ | $b_{P+1,Q+1}$ ... $b_{P+1,2Q}$ |
| $\vdots$ | $\vdots$ | $\vdots$ |
| $b_{2P,1}$ ... $b_{2P+Q}$ | $b_{P,Q+1}$ ... $b_{P+2Q}$ | $b_{2P,Q+1}$ ... $b_{2P+2Q}$ |

Antenna 1

Frequency

| | $f_1$ ... $f_Q$ | ... $f_{2Q}$ | ... $f_{3Q}$ |

Time, $t_1$ to $t_{2P}$:

| $-b^*_{P+1,1}$ ... $-b^*_{P+1,Q}$ | $b^*_{1,1}$ ... $b^*_{1,Q}$ | $b^*_{P+1,Q+1}$ ... $b^*_{P+1,2Q}$ |
| $\vdots$ | $\vdots$ | $\vdots$ |
| $-b^*_{2N}$ ... $-b^*_{2P+Q}$ | $b^*_{P,1}$ ... $b^*_{P,Q}$ | $b^*_{2P,Q+1}$ ... $b^*_{2P,2Q}$ |
| $b^*_{1,1}$ ... $b^*_{1,Q}$ | $b^*_{P+1,Q+1}$ ... $b^*_{P+1,2Q}$ | $-b^*_{1,Q+1}$ ... $-b^*_{1,2Q}$ |
| $\vdots$ | $\vdots$ | $\vdots$ |
| $b^*_{P,1}$ ... $b^*_{P,Q}$ | $b^*_{2P,Q+1}$ ... $b^*_{2P+2Q}$ | $-b^*_{P,Q+1}$ ... $-b^*_{P+2Q}$ |

Antenna 2

METHOD OF AND APPARATUS FOR SPACE-TIME-FREQUENCY CODING

The invention relates to wireless communication systems, and more particularly, relates to a method and apparatus of space-time-frequency diversity coding for use in a multi-carrier wireless communication system.

In a wireless communication system, it is important to overcome channel fading and interference and therefore provide high quality data service for subscribers. Recently, Space-Time Block Coding (STBC) attracted extensive attention from industry and was selected as one of transmission schemes by 3GPP UMTS because of the simple and efficient encoding and decoding.

STBC can be applied in Orthogonal Frequency Division Multiplexing (OFDM) system as an attractive solution in a multi-path fading environment. The system is considered as space-time block coded OFDM. When the block codes are formed over space and frequency instead of space and time domains, it is considered as space-frequency block coded OFDM.

Patent Application entitled "Space-Time-Frequency Diversity for Multi-carrier systems", published in Aug. 26, 2004 with publish no WO2004/073275A1, disclosed a technique to use multiple antennas to realize transmission diversity. According to the technique provided by the patent application, it first transforms transmission symbols into a plurality of transmission streams using a predetermined transformation rule, assigns transmission stream elements in frequency and time to multiple sub-carriers available at each antenna, and then transmits the elements. As the scheme adopts orthogonal design to realize space-time-frequency orthogonal and the space-time encoding and space-frequency encoding are independent in the scheme, the transmit diversity gain obtained from the method is one-dimension space-time diversity gain or space-frequency diversity gain.

There is therefore a need in the art for a new technique to further improve transmit diversity gain.

Amongst others it is an object of the invention to provide a method of encoding to improve transmit diversity gain.

To this end the invention provides a space-time-frequency encoding method comprising steps: transforming a plurality of input element pairs into a plurality of orthogonal element pairs respectively, each of the plurality of input element pairs and corresponding orthogonal element pairs forming an orthogonal matrix; and mapping the first element, second element and the redundancy of the second element in each of the plurality of input element pairs and corresponding orthogonal element pairs as channel elements to three predetermined time-frequency cells in a first and second two-dimension time-frequency matrix so as to make the channel elements in the first and second matrixes suitable for being transmitted via different antennas.

Amongst others it is another object of the invention to provide an apparatus for space-time-frequency encoding, the apparatus comprising: a transforming unit for transforming a plurality of input element pairs into a plurality orthogonal element pairs respectively, each of the plurality of input element pairs and corresponding orthogonal element pairs forming an orthogonal matrix; and a mapping unit for mapping a first element, a second element and a redundancy of the second element in each of the plurality of input element pairs and corresponding orthogonal element pairs as channel elements to three predetermined time-frequency cells in a first and second two-dimension time-frequency matrix so as to make the channel elements in the first and second matrixes suitable for being transmitted via different antennas.

According to the method and apparatus provided by the invention, as the redundant input element pairs and corresponding orthogonal element pairs transmitted via different antennas are orthogonal in both the space-time domain and the space-frequency domain at the same time, and thus two-dimension space-time transmit diversity gain and space-frequency transmit diversity gain can be achieved at the same time.

The above and other objects and features of the present invention will become more apparent from the following detailed description considered in connection with the accompanying drawing figures, in which.

In the figures, the same reference number represents the same, similar or corresponding feature or function.

The basic idea of the encoding scheme provided by the invention is to realize space-time orthogonality and space-frequency orthogonality between two time-frequency matrixes transmitted by two antennas by smartly allocating channel elements and thus achieving two-dimension space-time transmit diversity gain and space-frequency transmit diversity gain at the same time. Additionally, the orthogonal space-time coding and orthogonal space-frequency coding can have similar architecture with conventional space-time block coding so that at a corresponding receiver the received channel elements can be linearly combined to recover the transmitted symbols, and results in a very simple decoding process.

Figure 1:
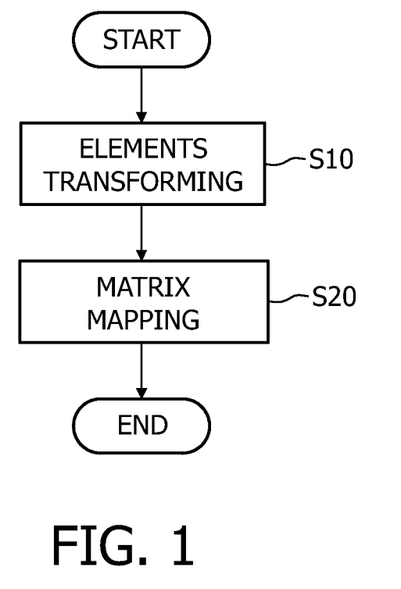
FIG. 1 is a flowchart illustrating an embodiment of encoding method in accordance with the invention.
Figure 2:
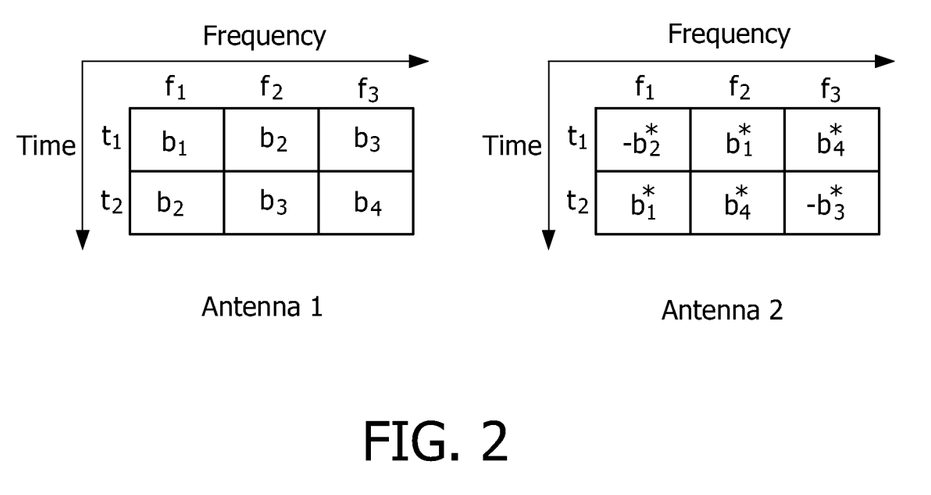
FIG. 2 shows a first embodiment of mapping channel elements to time-frequency matrixes in accordance with the invention.
Figure 3:
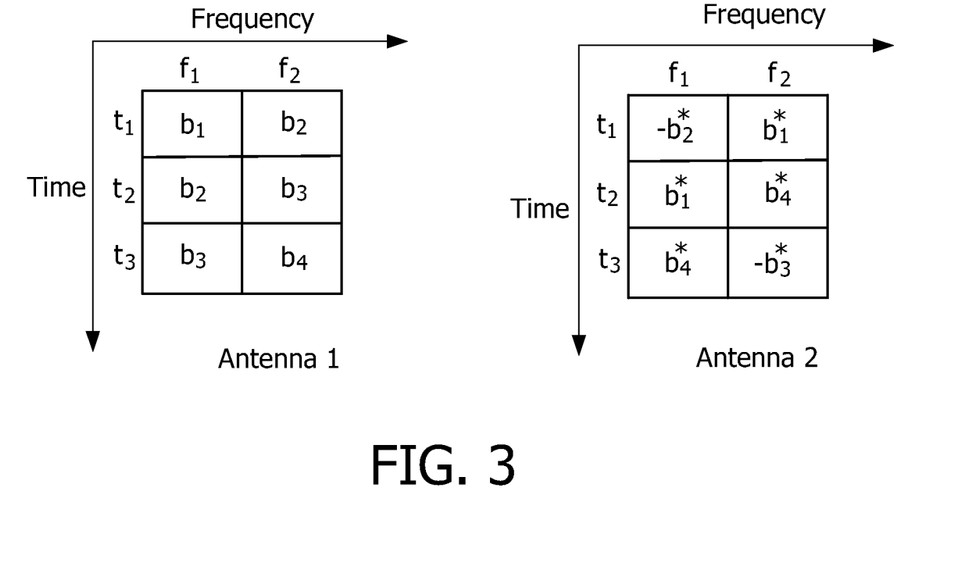
FIG. 3 shows a second embodiment of mapping channel elements to time-frequency matrixes in accordance with the invention.
Figure 4:
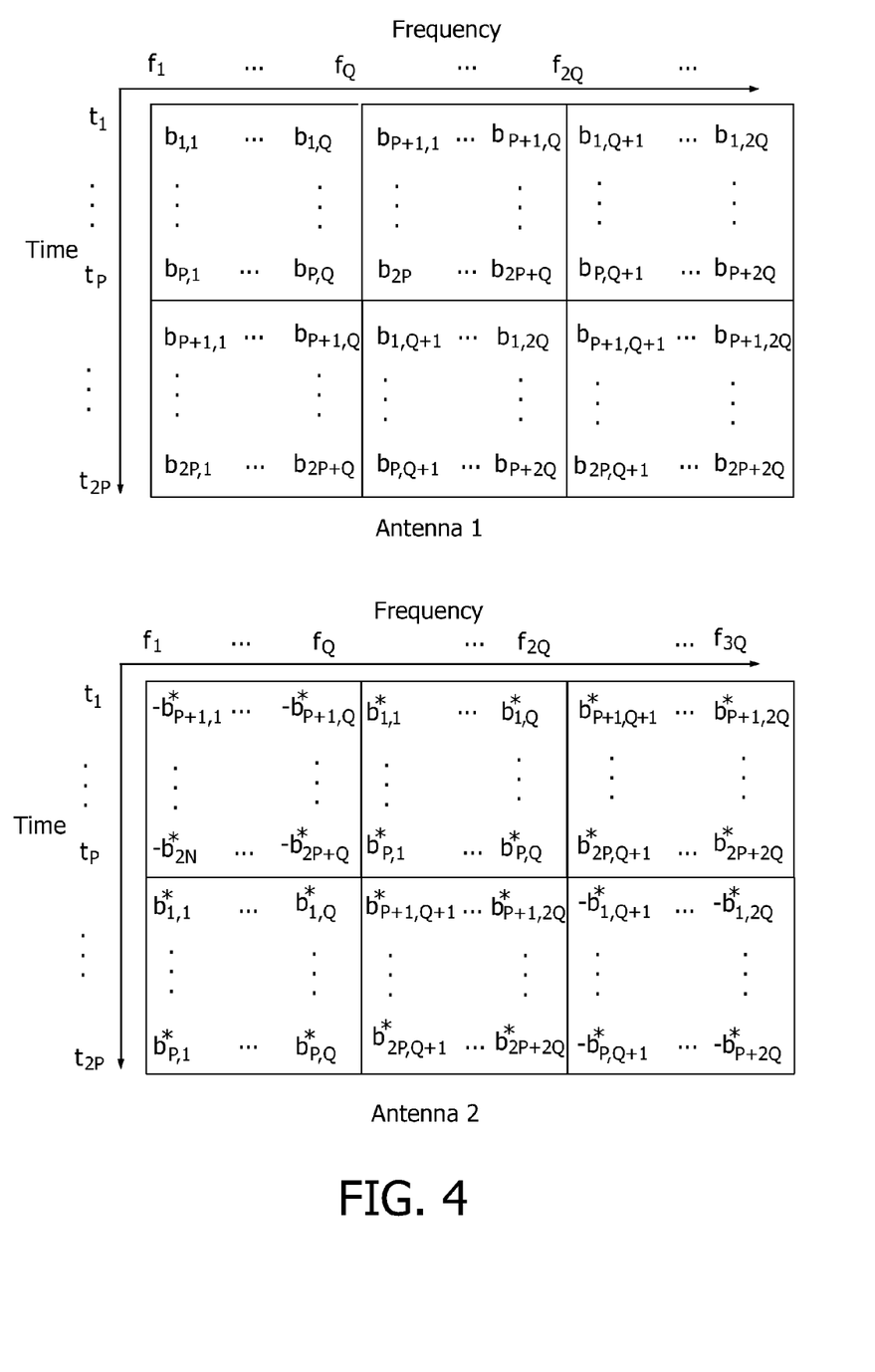
FIG. 4 shows a third embodiment of mapping channel elements to time-frequency matrixes in accordance with the invention.

FIG. 1 is a flowchart illustrating an embodiment of an encoding method in accordance with the invention. FIG. 2 shows a first embodiment of mapping channel elements to time-frequency matrixes in accordance with the invention. FIG. 3 shows a second embodiment of mapping channel elements to time-frequency matrixes in accordance with the invention. FIG. 4 shows a third embodiment of mapping channel elements to time-frequency matrixes in accordance with the invention. The method provided by the invention becomes more apparent from the following detailed description considered in connection with the accompanying drawings FIG. 1 to FIG. 4.

In the process of the method as shown in FIG. 1, a plurality of input element pairs are first transformed into a plurality orthogonal element pairs respectively in step S10. Each of the plurality of input element pairs and corresponding orthogonal element pairs form an orthogonal matrix. Then, the first element, second element and a redundancy of the second element in each of the plurality of input element pairs and corresponding orthogonal element pairs as channel elements are mapped to three predetermined time-frequency cells in respective first and second two-dimension time-frequency matrixes in step S20. The channel elements in the first and second matrixes are to be transmitted via different antennas. The element-transforming step S10 and matrix-mapping step S20 are explained with embodiments shown in FIGS. 2 to 4.

The elements transforming in step S10 is realized by carrying out negation and conjugation operations on the input element pairs that are similar to the operations of space-time block coding. Assuming that the first and second input element pairs are $\{b_1,b_2\}$ and $\{b_4,b_3\}$, performing space-time block coding on them, the corresponding orthogonal element pairs are $\{-b^*_2,b^*_1\}$ and $\{b^*_3,-b^*_4\}$, wherein [ ]* denotes conjugation operation. The first and second input element pairs and their corresponding orthogonal element pairs form two matrixes respectively as $$A_1 = \begin{bmatrix} b_1 & -b_2^* \\ b_2 & b_1^* \end{bmatrix} \text{ and }$$

$$A_2 = \begin{bmatrix} b_3 & -b_4^* \\ b_4 & b_3^* \end{bmatrix},$$

which are orthogonal matrixes meeting $A_1 \cdot A_1^T = I$ and $A_2 \cdot A_2^T = I$, I is identity matrix, $[\ ]^T$ denotes transpose operation.

Mapping the input elements and orthogonal elements to time-frequency matrixes is performed in step S20. The transmit diversity obtained from coding provided in the invention comprises two parts: space-time transmit diversity and space-frequency diversity that are achieved at same time by smart allocation of channel elements.

The first and second time-frequency matrixes in FIG. 2 are transmitted respectively by first and second antennas. The rows and columns in the two matrixes denote time units and frequency units, respectively. The input element pairs $\{b_1, b_2\}$, $\{b_4,b_3\}$ are mapped to the first matrix and the orthogonal elements pairs $\{-b^*_2,b^*_1\}$, $\{b^*_3,-b^*_4\}$ are mapped to the second matrix as illustrated in FIG. 2.

When $b_1$, $b_2$, $b_3$ and $b_4$ are data symbols, the time unit and frequency unit are time-slot and sub-carrier respectively. The data symbols $b_1$, $b_2$, $b_3$ and $b_4$ occupy six time-frequency cells corresponding to three sub-carriers and two time-slots. The input element pair $\{b_1,b_2\}$ transmitted at time-slot $t_1$ and sub-carrier $f_1$ and $f_2$ via the first antenna and the orthogonal element pair $\{-b^*_2,b^*_1\}$ transmitted at time-slot $t_1$ and sub-carrier $f_1$ and $f_2$ via the second antenna constitute space-frequency transmit diversity. The input element pair $\{b_1,b_2\}$ transmitted at time-slot $t_1$ and $t_2$ and sub-carrier $f_1$ via the first antenna and the orthogonal element pair $\{-b^*_2,b^*_1\}$ transmitted at time-slot $t_1$ and $t_2$ and sub-carrier $f_1$ via the second antenna constitute space-time transmit diversity. Here the symbol $b_1$ and $-b^*_2$ transmitted on time-slot $t_1$ and sub-carrier $f_1$ are reused for space-time transmit diversity and space-frequency transmit diversity.

The transmit diversity gain generated by the encoding method provided by the invention is explained as below with conjunct consideration of mathematics expression. Without losing generality, for conventional wireless communication systems such as 3GPP or WLAN, it is reasonable to assume that the channel response of adjacent time-slots or sub-carriers has time-invariant characteristics. When the wireless channels suffer very deep and slow fading, the channel response remains constant over the time and frequency corresponding to an input elements pair or an orthogonal elements pair, i.e.:

$$h_{m,i,j} = h_{m,i+1,j+1} = h_m \quad (1)$$

wherein, m is number of antennas, i is sequence number of time-slot and j is sequence number of sub-carriers. In this embodiment, m=2. At a receiving side, the received channel elements are linearly combined and a maximum likelihood decision is taken to recover the input elements.

The received channel element corresponding to time-slot $t_1$ and sub-carrier $f_1$ can be expressed as:

$$R_1 = h_1 b_1 - h_2 b^*_2 + n_1 \quad (2)$$

The received channel element corresponding to time-slot $t_2$ and sub-carrier $f_1$ can be expressed as:

$$R_2 = h_1 b_2 + h_2 b^*_1 + n_2 \quad (3)$$

The received channel element corresponding to time-slot $t_1$ and sub-carrier $f_2$ can be expressed as:

$$R_3 = h_1 b_2 + h_2 b^*_1 + n_3 \quad (4)$$

$b_1$ and $b_2$ are decoded according to equation as below:

$$\tilde{b}_1 = h_1^* R_1 + h_2 R_2^* + h_1^* R_1 + h_2 R_3^* \quad (5)$$
$$= 2(|h_1|^2 + |h_2|^2) \cdot b_1 + 2h_1^* n_1 + h_2 n_2^* + h_2 n_3^*$$

$$\tilde{b}_2 = h_2 R_1^* + h_1^* R_2 + h_2 R_1^* + h_1^* R_3 \quad (6)$$
$$= 2(|h_1|^2 + |h_2|^2) \cdot b_2 + 2h_2 n_1^* + h_1^* n_2 + h_1^* n_3$$

The maximum likelihood (ML) decision is just to make the decision as the follows:

$$\hat{b}_1 = \text{mixmum}(\tilde{b}_1 - 2(|h_1|^2 + |h_2|^2) \cdot \overline{b}_1) \quad (7)$$

$$\hat{b}_2 = \text{mixmum}(\tilde{b}_2 - 2(|h_1|^2 + |h_2|^2) \cdot \overline{b}_2) \quad (8)$$

where $\hat{b}_1, \hat{b}_2$ is the decision results, $\overline{b}_1, \overline{b}_2$ is the symbols used for ML decision.

In equ. 5, the signal energy of $b_1$ is $(2(|h_1|^2+|h_2|^2))^2 \cdot E_b$, and the noise power spectrum density is $(4|h_1|^2+|h_2|^2+|h_2|^2) \cdot N_0$, so the signal to noise ratio is:

$$SNR = \frac{(2(|h_1|^2 + |h_2|^2))^2 \cdot E_b}{(4|h_1|^2 + 2|h_2|^2) \cdot N_0} > (|h_1|^2 + |h_2|^2) \cdot \frac{E_b}{N_0} \quad (9)$$

The diversity gain $$\frac{(2(|h_1|^2 + |h_2|^2))^2}{(4|h_1|^2 + 2|h_2|^2)}$$

is total diversity gain obtained from space-time transmit diversity and space-frequency diversity provided by the invention. It is clear that the total diversity gain is more than $(|h_1|^2+|h_2|^2)$, which is the diversity gain of conventional space time block coding or space frequency block coding. Therefore, the space-time-frequency coding has better performance than the conventional schemes.

FIG. 3 shows a second embodiment of mapping channel elements to time-frequency matrixes in accordance with the invention. In this case, the data symbols $b_1$, $b_2$, $b_3$ and $b_4$ occupy six time-frequency cells corresponding to two sub-carriers and three time-slots.

FIG. 4 shows a third embodiment of mapping channel elements to time-frequency matrixes in accordance with the invention. In this case, the input symbol is extended to be symbol blocks.

Figure 5:
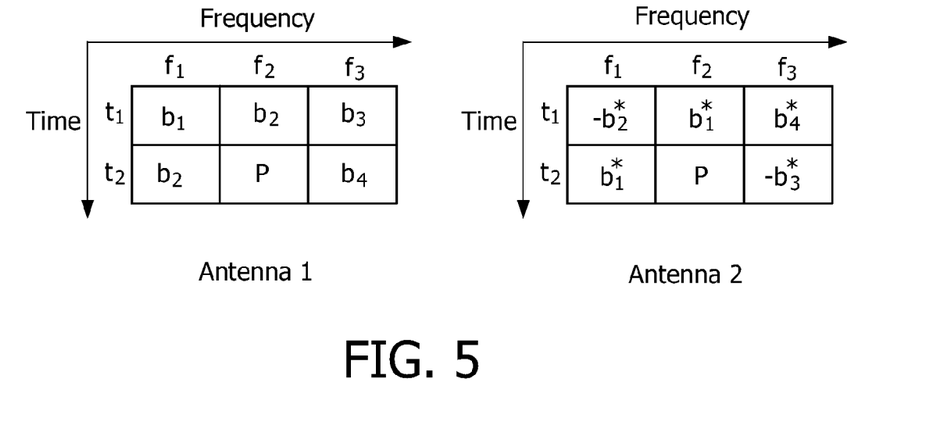
FIG. 5 shows a fourth embodiment of mapping channel elements to time-frequency matrixes in accordance with the invention.
Figure 6:
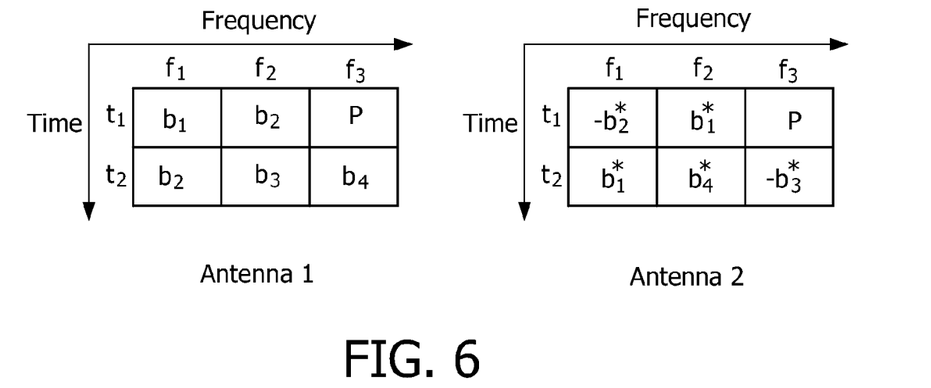
FIG. 6 shows a fifth embodiment of mapping channel elements to time-frequency matrixes in accordance with the invention.

FIG. 5 and FIG. 6 show a fourth and fifth embodiments of mapping channel elements to time-frequency matrixes in accordance with the invention. The channel element P is a specific input element having different attribute from input elements $b_1$, $b_2$, $b_3$ and $b_4$. For example, P is a symbol representing a pilot signal, $b_1$, $b_2$, $b_3$ and $b_4$ are symbols representing data. As space-time block coding and space-frequency block coding can process input elements in pairs, a single input element may cooperate with space-time block coding and space-frequency block coding to fill the in-pair time-frequency cells.

In embodiments of mapping channel elements to time-frequency matrixes as shown in FIG. 2 to FIG. 6, the first element, second element and the redundancy of the second element in each of the plurality of input element pairs and corresponding orthogonal element pairs are mapped as channel elements to three predetermined time-frequency cells in a first and second two-dimension time-frequency matrix. The three predetermined time-frequency cells are three of the four time-frequency cells corresponding to two predetermined time units and two predetermined frequency units. The two predetermined time units and/or two predetermined frequency units must not be adjacent if the channel response of the three cells meet the requirement of time-invariant characteristics.

The encoding method provided by the invention can be also applied to orthogonal frequency division multiplexing systems. In this case, the channel elements are transformed from frequency-domain to time-domain via Inverse Discrete Fourier Transform before transmission. At receiving side, Discrete Fourier Transform is used to transform the received channel elements from time-domain to frequency-domain before decoding.

The above encoding method as illustrated in FIG. 1-6 can be implemented in software or hardware, or in combination of both.

Figure 7:
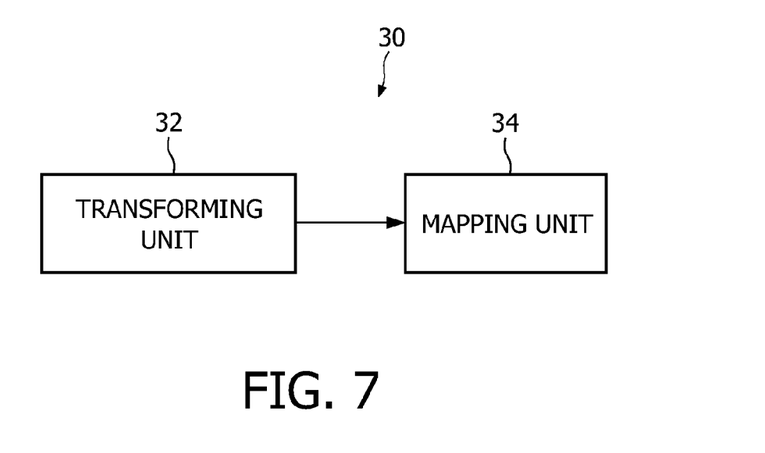
FIG. 7 is a block diagram illustrating an embodiment of an encoding apparatus in accordance with the invention.

FIG. 7 is a block diagram illustrating an embodiment of encoding apparatus in accordance with the invention. The encoding apparatus 30 comprises a transforming unit 32 and a mapping unit 34.

The transforming unit 32 is arranged to transform a plurality of input element pairs into a plurality orthogonal element pairs respectively. Each of the plurality of input element pairs and corresponding orthogonal element pairs forms an orthogonal matrix. The transforming unit 32 performs complex conjugation and negation operations on the input element pair. Assuming the input element pairs are $\{b_1,b_2\}$ and $\{b_4,b_3\}$, performing space-time block coding on them, the corresponding orthogonal element pairs are $\{-b^*_2,b^*_1\}$ and $\{b^*_3,-b^*_4\}$, where [ ]* denotes a conjugation operation. The first and second input element pairs and their corresponding orthogonal element pairs form two matrixes respectively as $$A_1 = \begin{bmatrix} b_1 & -b^*_2 \\ b_2 & b^*_1 \end{bmatrix} \text{ and }$$

$$A_2 = \begin{bmatrix} b_3 & -b^*_4 \\ b_4 & b^*_3 \end{bmatrix},$$

which are orthogonal matrixes meeting $A_1 \cdot A_1^T = I$ and $A_2 \cdot A_2^T = I$, I is identity matrix, $[\ ]^T$ denotes transpose operation.

The mapping unit 34 is arranged to map the first element, second element and the redundancy of the second element in each of the plurality of input element pairs and corresponding orthogonal element pairs as channel elements to three predetermined time-frequency cells in a first and second two-dimension time-frequency matrix so as to make the channel elements in the first and second matrixes suitable for being transmitted via different antennas. More particularly, the mapping unit 34 allocates the input element pairs $\{b_1,b_2\}$ and $\{b_4,b_3\}$ and corresponding orthogonal element pairs $\{-b^*_2, b^*_1\}$ and $\{b^*_3,-b^*_4\}$ and/or specific channel element, for example a pilot symbol, to predetermined time-frequency cells to obtain two matrixes as illustrated in FIG. 2 to 6. The channel elements in the two matrixes are transmitted via two different antennas for achieving space-time transmit diversity and space-frequency transmit diversity at the same time.

The embodiments of the present invention described herein are intended to be taken in an illustrative and not a limiting sense. Various modifications may be made to these embodiments by those skilled in the art without departing from the scope of the present invention as defined in the appended claims.

The invention claimed is:

1. A method of encoding input channel element pairs for transmission, said method comprising:
    (a) transforming first and second input channel element pairs into respective first and second orthogonal channel element pairs;
        (1) said first input channel element pair and first orthogonal channel element pair forming a first orthogonal matrix; and
        (2) said second input channel element pair and second orthogonal channel element pair forming a second orthogonal matrix;
    (b) mapping a first element and a second element, which form the first input channel element pair, and a third element, which is a duplicate of said second element, to respective first, second and third predetermined time-frequency cells in a first two-dimension time-frequency matrix for transmission via a first antenna, said first and second elements being mapped for transmission at different frequencies and said first and third elements being mapped for transmission at different times;
    (c) mapping a fourth element and a fifth element, which form the second input channel element pair, and a sixth element, which is a duplicate of said fifth element, to respective fourth, fifth and sixth predetermined time-frequency cells in the first two-dimension time-frequency matrix for transmission via the first antenna, said fourth and fifth elements being mapped for transmission at different frequencies and said fourth and sixth elements being mapped for transmission at different times;
    (d) mapping a seventh element and an eighth element, which form the first orthogonal channel element pair, and a ninth element, which is a duplicate of said eighth element, to respective first, second and third predetermined time-frequency cells in a second two-dimension time frequency matrix for transmission via a second antenna, said seventh and eighth elements being mapped for transmission at different frequencies and said seventh and ninth elements being mapped for transmission at different times; and
    (e) mapping a tenth element and an eleventh element, which form the second orthogonal channel element pair, and a twelfth element, which is a duplicate of said eleventh element, to respective fourth, fifth and sixth predetermined time-frequency cells in the second two-dimension time-frequency matrix for transmission via the second antenna, said tenth and eleventh elements being mapped for transmission at different frequencies and said tenth and twelfth elements being mapped for transmission at different times.

2. A method as claimed in claim 1 where, in steps (b), (c), (d) and (e), the three predetermined time-frequency cells are three of four time-frequency cells comprising two predetermined time-unit cells and two predetermined frequency-unit cells.

3. A method of encoding input channel element pairs for transmission, said method comprising:
 (a) transforming first and second input channel element pairs into respective first and second orthogonal channel element pairs;
  (1) said first input channel element pair and first orthogonal channel element pair forming a first orthogonal matrix; and
  (2) said second input channel element pair and second orthogonal channel element pair forming a second orthogonal matrix;
 (b) mapping a first element and a second element, which form the first input channel element pair, and a third element, which is a duplicate of said second element, to respective first, second and third predetermined time-frequency cells in a first two-dimension time-frequency matrix for transmission via a first antenna, said first and second elements being mapped for transmission at different frequencies and said first and third elements being mapped for transmission at different times;
 (c) mapping a fourth element and a fifth element, which form the second input channel element pair, and a sixth element, which is a duplicate of said fifth element, to respective fourth, fifth and sixth predetermined time-frequency cells in the first two-dimension time-frequency matrix for transmission via the first antenna, said fourth and fifth elements being mapped for transmission at different frequencies and said fourth and sixth elements being mapped for transmission at different times;
 (d) mapping a seventh element and an eighth element, which form the first orthogonal channel element pair, and a ninth element, which is a duplicate of said eighth element, to respective first, second and third predetermined time-frequency cells in a second two-dimension time frequency matrix for transmission via a second antenna, said seventh and eighth elements being mapped for transmission at different frequencies and said seventh and ninth elements being mapped for transmission at different times; and
 (e) mapping a tenth element and an eleventh element, which form the second orthogonal channel element pair, and a twelfth element, which is a duplicate of said eleventh element, to respective fourth, fifth and sixth predetermined time-frequency cells in the second two-dimension time-frequency matrix for transmission via the second antenna, said tenth and eleventh elements being mapped for transmission at different frequencies and said tenth and twelfth elements being mapped for transmission at different times;
 where, in steps (b), (c), (d) and (e), the three predetermined time-frequency cells are three of four time-frequency cells comprising two predetermined time-unit cells and two predetermined frequency-unit cells; and
 where the first and second input channel element pairs are $\{b_1,b_2\}$, $\{b_4,b_3\}$, the first and second orthogonal channel element pairs are $\{-b^*_2,b^*_1\}$ and $\{b^*_3,-b^*_4\}$, $b^*_i$ is the complex conjugation of $b_i$, and the result obtained by mapping the first and second input channel element pairs and the first and second orthogonal channel element pairs as channel elements to the first and second two-dimension matrixes is:

$$\begin{bmatrix} b_1 & b_2 & b_3 \\ b_2 & b_3 & b_4 \end{bmatrix} \text{ and } \begin{bmatrix} -b^*_2 & b^*_1 & b^*_4 \\ b^*_1 & b^*_4 & -b^*_3 \end{bmatrix}$$

where the rows and columns of the matrixes correspond to time units and frequency units, respectively.

4. A method of encoding input channel element pairs for transmission, said method comprising:
 (a) transforming first and second input channel element pairs into respective first and second orthogonal channel element pairs;
  (1) said first input channel element pair and first orthogonal channel element pair forming a first orthogonal matrix; and
  (2) said second input channel element pair and second orthogonal channel element pair forming a second orthogonal matrix;
 (b) mapping a first element and a second element, which form the first input channel element pair, and a third element, which is a duplicate of said second element, to respective first, second and third predetermined time-frequency cells in a first two-dimension time-frequency matrix for transmission via a first antenna, said first and second elements being mapped for transmission at different frequencies and said first and third elements being mapped for transmission at different times;
 (c) mapping a fourth element and a fifth element, which form the second input channel element pair, and a sixth element, which is a duplicate of said fifth element, to respective fourth, fifth and sixth predetermined time-frequency cells in the first two-dimension time-frequency matrix for transmission via the first antenna, said fourth and fifth elements being mapped for transmission at different frequencies and said fourth and sixth elements being mapped for transmission at different times;
 (d) mapping a seventh element and an eighth element, which form the first orthogonal channel element pair, and a ninth element, which is a duplicate of said eighth element, to respective first, second and third predetermined time-frequency cells in a second two-dimension time frequency matrix for transmission via a second antenna, said seventh and eighth elements being mapped for transmission at different frequencies and said seventh and ninth elements being mapped for transmission at different times; and
 (e) mapping a tenth element and an eleventh element, which form the second orthogonal channel element pair, and a twelfth element, which is a duplicate of said eleventh element, to respective fourth, fifth and sixth predetermined time-frequency cells in the second two-dimension time-frequency matrix for transmission via the second antenna, said tenth and eleventh elements being mapped for transmission at different frequencies and said tenth and twelfth elements being mapped for transmission at different times;
 where, in steps (b), (c), (d) and (e), the three predetermined time-frequency cells are three of four time-frequency cells comprising two predetermined time-unit cells and two predetermined frequency-unit cells; and
 where the first and second input channel element pairs are $\{b_1,b_2\}$, $\{b_4,b_3\}$, the first and second orthogonal channel element pairs are $\{-b^*_2,b^*_1\}$ and $\{b^*_3,-b^*_4\}$, $b^*_i$ is the complex conjugation of $b_i$, and the result obtained by mapping the first and second input channel element pairs and the first and second orthogonal channel element pairs as channel elements to the first and second two-dimension matrixes is:

$$\begin{bmatrix} b_1 & b_2 \\ b_2 & b_3 \\ b_3 & b_4 \end{bmatrix} \text{ and } \begin{bmatrix} -b_2^* & b_1^* \\ b_1^* & b_4^* \\ b_4^* & -b_3^* \end{bmatrix}$$

where the rows and columns of the matrixes correspond to time units and frequency units, respectively.

5. A method of encoding input channel element pairs for transmission, said method comprising:
   (a) transforming first and second input channel element pairs into respective first and second orthogonal channel element pairs;
      (1) said first input channel element pair and first orthogonal channel element pair forming a first orthogonal matrix; and
      (2) said second input channel element pair and second orthogonal channel element pair forming a second orthogonal matrix;
   (b) mapping a first element and a second element, which form the first input channel element pair, and a third element, which is a duplicate of said second element, to respective first, second and third predetermined time-frequency cells in a first two-dimension time-frequency matrix for transmission via a first antenna, said first and second elements being mapped for transmission at different frequencies and said first and third elements being mapped for transmission at different times;
   (c) mapping a fourth element and a fifth element, which form the second input channel element pair, and a sixth element, which is a duplicate of said fifth element, to respective fourth, fifth and sixth predetermined time-frequency cells in the first two-dimension time-frequency matrix for transmission via the first antenna, said fourth and fifth elements being mapped for transmission at different frequencies and said fourth and sixth elements being mapped for transmission at different times;
   (d) mapping a seventh element and an eighth element, which form the first orthogonal channel element pair, and a ninth element, which is a duplicate of said eighth element, to respective first, second and third predetermined time-frequency cells in a second two-dimension time frequency matrix for transmission via a second antenna, said seventh and eighth elements being mapped for transmission at different frequencies and said seventh and ninth elements being mapped for transmission at different times; and
   (e) mapping a tenth element and an eleventh element, which form the second orthogonal channel element pair, and a twelfth element, which is a duplicate of said eleventh element, to respective fourth, fifth and sixth predetermined time-frequency cells in the second two-dimension time-frequency matrix for transmission via the second antenna, said tenth and eleventh elements being mapped for transmission at different frequencies and said tenth and twelfth elements being mapped for transmission at different times;
   where, in steps (b), (c), (d) and (e), the three predetermined time-frequency cells are three of four time-frequency cells comprising two predetermined time-unit cells and two predetermined frequency-unit cells; and where the first and second input channel element pairs are $\{b_1, b_2\}$, the first and second orthogonal channel element pairs are $\{-b_2^*, b_1^*\}$, $b_i^*$ is the complex conjugation of $b_i$, and the result obtained by mapping the first and second input channel element pairs, the first and second orthogonal channel element pairs and a specific input element P as channel elements to the first and second two-dimension matrixes is:

$$\begin{bmatrix} b_1 & b_2 \\ b_2 & P \end{bmatrix} \text{ and } \begin{bmatrix} -b_2^* & b_1^* \\ b_1^* & P \end{bmatrix}$$

where the rows and columns of the matrixes correspond to time units and frequency units, respectively, and P and $b_i$ are channel elements with different attributes.

6. A method as claimed in claim 1, where the input channel elements comprise a symbol block corresponding to a plurality of sub-carriers and symbol intervals and the number of symbols contained in a block equals the product of the number of sub-carriers and the number of symbol intervals contained in said block.

7. A method as claimed in claim 1, where the input channel elements comprise symbols and the time-frequency cells comprise time slots and sub-carriers, respectively.

8. An apparatus for encoding input channel element pairs for transmission, said apparatus comprising:
   (a) a transforming unit for transforming first and second input channel element pairs into respective first and second orthogonal channel element pairs;
      (1) said first input channel element pair and first orthogonal channel element pair forming a first orthogonal matrix; and
      (2) said second input channel element pair and second orthogonal channel element pair forming a second orthogonal matrix; and
   (b) a mapping unit for:
      (1) mapping a first element and a second element, which form the first input channel element pair, and a third element, which is a duplicate of said second element, to respective first, second and third predetermined time-frequency cells in a first two-dimension time-frequency matrix for transmission via a first antenna, said first and second elements being mapped for transmission at different frequencies and said first and third elements being mapped for transmission at different times;
      (2) mapping a fourth element and a fifth element, which form the second input channel element pair, and a sixth element, which is a duplicate of said fifth element, to respective fourth, fifth and sixth predetermined time-frequency cells in the first two-dimension time-frequency matrix for transmission via the first antenna, said fourth and fifth elements being mapped for transmission at different frequencies and said fourth and sixth elements being mapped for transmission at different times;
      (3) mapping a seventh element and an eighth element, which form the first orthogonal channel element pair, and a ninth element, which is a duplicate of said eighth element, to respective first, second and third predetermined time-frequency cells in a second two-dimension time frequency matrix for transmission via a second antenna, said seventh and eighth elements being mapped for transmission at different frequencies and said seventh and ninth elements being mapped for transmission at different times; and (4) mapping a tenth element and an eleventh element, which form the second orthogonal channel element pair, and a twelfth element, which is a duplicate of said eleventh element, to respective fourth, fifth and sixth predetermined time-frequency cells in the second two-dimension time-frequency matrix for transmission via the second antenna, said tenth and eleventh elements being mapped for transmission at different frequencies and said tenth and twelfth elements being mapped for transmission at different times.

9. An apparatus as claimed in claim 8 where, in mapping steps (b)(1), (b)(2), (b)(3) and (b)(4), the three predetermined time-frequency cells are three of four time-frequency cells comprising two predetermined time-unit cells and two predetermined frequency-unit cells.

10. An apparatus for encoding input channel element pairs for transmission, said apparatus comprising:

(a) a transforming unit for transforming first and second input channel element pairs into respective first and second orthogonal channel element pairs;

(1) said first input channel element pair and first orthogonal channel element pair forming a first orthogonal matrix; and (2) said second input channel element pair and second orthogonal channel element pair forming a second orthogonal matrix; and (b) a mapping unit for:

(1) mapping a first element and a second element, which form the first input channel element pair, and a third element, which is a duplicate of said second element, to respective first, second and third predetermined time-frequency cells in a first two-dimension time-frequency matrix;

(2) mapping a fourth element and a fifth element, which form the second input channel element pair, and a sixth element, which is a duplicate of said fifth element, to respective fourth, fifth and sixth predetermined time-frequency cells in the first two-dimension time-frequency matrix;

(3) mapping a seventh element and an eighth element, which form the first orthogonal channel element pair, and a ninth element, which is a duplicate of said eighth element, to respective first, second and third predetermined time-frequency cells in a second two-dimension time frequency matrix; and (4) mapping a tenth element and an eleventh element, which for the second orthogonal channel element pair, and a twelfth element, which is a duplicate of said eleventh element, to respective fourth, fifth and sixth predetermined time-frequency cells in the second two-dimension time-frequency matrix;

said elements mapped in the first and second two-dimension time-frequency matrixes being provided for transmission via respective first and second antennas;

where, in mapping steps (b)(1), (b)(2), (b)(3) and (b)(4), the three predetermined time-frequency cells are three of four time-frequency cells comprising two predetermined time-unit cells and two predetermined frequency-unit cells; and where the first and second input channel element pairs are $\{b_1,b_2\}$, $\{b_4,b_3\}$, the first and second orthogonal channel element pairs are $\{-b^*_2,b^*_1\}$ and $\{b^*_3,-b^*_4\}$, $b^*_i$ is the complex conjugation of $b_i$, and the result obtained by mapping the first and second input channel element pairs and the first and second orthogonal channel element pairs as channel elements to the first and second two-dimension matrixes is:

$$\begin{bmatrix} b_1 & b_2 & b_3 \\ b_2 & b_3 & b_4 \end{bmatrix} \text{ and } \begin{bmatrix} -b^*_2 & b^*_1 & b^*_4 \\ b^*_1 & b^*_4 & -b^*_3 \end{bmatrix}$$

where the rows and columns of the matrixes correspond to time units and frequency units, respectively.

11. An apparatus for encoding input channel element pairs for transmission, said apparatus comprising:

(a) a transforming unit for transforming first and second input channel element pairs into respective first and second orthogonal channel element pairs;

(1) said first input channel element pair and first orthogonal channel element pair forming a first orthogonal matrix; and (2) said second input channel element pair and second orthogonal channel element pair forming a second orthogonal matrix; and (b) a mapping unit for:

(1) mapping a first element and a second element, which form the first input channel element pair, and a third element, which is a duplicate of said second element, to respective first, second and third predetermined time-frequency cells in a first two-dimension time-frequency matrix;

(2) mapping a fourth element and a fifth element, which form the second input channel element pair, and a sixth element, which is a duplicate of said fifth element, to respective fourth, fifth and sixth predetermined time-frequency cells in the first two-dimension time-frequency matrix;

(3) mapping a seventh element and an eighth element, which form the first orthogonal channel element pair, and a ninth element, which is a duplicate of said eighth element, to respective first, second and third predetermined time-frequency cells in a second two-dimension time frequency matrix; and (4) mapping a tenth element and an eleventh element, which form the second orthogonal channel element pair, and a twelfth element, which is a duplicate of said eleventh element, to respective fourth, fifth and sixth predetermined time-frequency cells in the second two-dimension time-frequency matrix;

said elements mapped in the first and second two-dimension time-frequency matrixes being provided for transmission via respective first and second antennas;

where, in mapping steps (b)(1), (b)(2), (b)(3) and (b)(4), the three predetermined time-frequency cells are three of four time-frequency cells comprising two predetermined time-unit cells and two predetermined frequency-unit cells; and where the first and second input channel element pairs are $\{b_1,b_2\}$, $\{b_4,b_3\}$, the first and second orthogonal channel element pairs are $\{-b^*_2,b^*_1\}$ and $\{b^*_3,-b^*_4\}$, $b^*_i$ is the complex conjugation of $b_i$, and the result obtained by mapping the first and second input channel element pairs and the first and second orthogonal channel element pairs as channel elements to the first and second two-dimension matrixes is:

$$\begin{bmatrix} b_1 & b_2 \\ b_2 & b_3 \\ b_3 & b_4 \end{bmatrix} \text{ and } \begin{bmatrix} -b_2^* & b_1^* \\ b_1^* & b_4^* \\ b_4^* & -b_3^* \end{bmatrix}$$

where the rows and columns of the matrixes correspond to time units and frequency units, respectively.

12. An apparatus for encoding input channel element pairs for transmission, said apparatus comprising:
(a) a transforming unit for transforming first and second input channel element pairs into respective first and second orthogonal channel element pairs;
  (1) said first input channel element pair and first orthogonal channel element pair forming a first orthogonal matrix; and
  (2) said second input channel element pair and second orthogonal channel element pair forming a second orthogonal matrix; and
(b) a mapping unit for:
  (1) mapping a first element and a second element, which form the first input channel element pair, and a third element, which is a duplicate of said second element, to respective first, second and third predetermined time-frequency cells in a first two-dimension time-frequency matrix;
  (2) mapping a fourth element and a fifth element, which form the second input channel element pair, and a sixth element, which is a duplicate of said fifth element, to respective fourth, fifth and sixth predetermined time-frequency cells in the first two-dimension time-frequency matrix;
  (3) mapping a seventh element and an eighth element, which form the first orthogonal channel element pair, and a ninth element, which is a duplicate of said eighth element, to respective first, second and third predetermined time-frequency cells in a second two-dimension time frequency matrix; and
  (4) mapping a tenth element and an eleventh element, which form the second orthogonal channel element pair, and a twelfth element, which is a duplicate of said eleventh element, to respective fourth, fifth and sixth predetermined time-frequency cells in the second two-dimension time-frequency matrix;
said elements mapped in the first and second two-dimension time-frequency matrixes being provided for transmission via respective first and second antennas;
where, in mapping steps (b)(1), (b)(2), (b)(3) and (b)(4), the three predetermined time-frequency cells are three of four time-frequency cells comprising two predetermined time-unit cells and two predetermined frequency-unit cells; and
where the first and second input channel element pairs are $\{b_1, b_2\}$, the first and second orthogonal channel element pairs are $\{-b^*_2, b^*_1\}$, $b^*_i$ is the complex conjugation of $b_i$, and the result obtained by mapping the first and second input channel element pairs, the first and second orthogonal channel element pairs and a specific input element P as channel elements to the first and second two-dimension matrixes is:

$$\begin{bmatrix} b_1 & b_2 \\ b_2 & P \end{bmatrix} \text{ and } \begin{bmatrix} -b_2^* & b_1^* \\ b_1^* & P \end{bmatrix}$$

where the rows and columns of the matrixes correspond to time units and frequency units, respectively, and P and $b_i$ are channel elements with different attributes.

\* \* \* \* \*